United States Patent [19]

Kalnins

[11] Patent Number: 4,933,094

[45] Date of Patent: Jun. 12, 1990

[54] METHOD AND APPARATUS FOR SEPARATING LIQUID COMPONENTS FROM A LIQUID MIXTURE

[75] Inventor: Charles M. Kalnins, Victoria, Australia

[73] Assignee: Conoco Specialty Products, Inc., Houston, Tex.

[21] Appl. No.: 252,508

[22] Filed: Sep. 30, 1988

[51] Int. Cl.$^5$ ............................................. B01D 17/038
[52] U.S. Cl. ................................... 210/788; 209/144; 209/211; 210/512.1
[58] Field of Search ............ 210/788, 787, 767, 512.1, 210/304; 209/144, 211

[56] References Cited

U.S. PATENT DOCUMENTS

| | | | |
|---|---|---|---|
| 4,749,490 | 6/1988 | Smyth et al. | 210/512.1 |
| 4,764,287 | 8/1988 | Coleman et al. | 210/512.1 |
| 4,793,924 | 12/1988 | Coleman et al. | 210/512.1 |

*Primary Examiner*—Frank Sever
*Attorney, Agent, or Firm*—John E. Holder

[57] ABSTRACT

Method and apparatus for separating oil-water mixtures in which the oil is present as droplets so as to comprise the disperse phase, the mean droplet size being greater than 56.7 micron, using a cyclone separator having a swirl coefficient, S, in the range $S' \leq S \leq S^{u2}$, where

$S' = -0.46 \phi + 31$ or $S' = 2$, whichever is the greater, and $S^{u2} = 0.26 \phi + 31.6$, where $\phi$ is the mean droplet size in micron.

The swirl coefficient is defined as $$\frac{d_i d_2}{4 A_i}$$

where $d_i$ is the effective diameter at the inlet to the separator $d_2$ is the nominal separator diameter at a downstream location, and $A_i$ is the total effective inlet area.

15 Claims, 12 Drawing Sheets

METHOD AND APPARATUS FOR SEPARATING LIQUID COMPONENTS FROM A LIQUID MIXTURE

BACKGROUND OF THE INVENTION

1. Field of the Invention

This invention relates to a method and apparatus for separating liquid components from a liquid mixture.

2. (ii) Prior Art

Until relatively recently, the use of hydrocyclones, or cyclone separators, in separating technology was thought to be limited to separation of components from mixtures where there were substantial differences in specific gravity of components to be separated. In particular, hydrocyclones were regarded as being of only limited usefulness in separating liquid components one from another in a liquid mixture, in view of the relatively small differences in specific gravity existing as between many liquids. More recently, however, cyclone separators capable of separating liquid components one from the other within a liquid mixture have become more commonly used. In particular, U.S. Pat. Nos. 4,237,006 and 4,576,724 describe cyclone separators capable of effective separation of liquid components, and these separators have found commercial application in oil processing technology, particularly in the separation of residual oil from a mixture predominantly comprising water. Such a mixture is produced as a by-product of initial separation of oil from formation liquid initially recovered from an oil well. Similar technology has subsequently been applied, using cyclone separators, for separation of oil and water components from admixtures thereof where there are significant quantities of water, unlike the last described application, where, generally speaking, the inlet liquid has only a relatively small amount of oil present therein.

In the arrangements described in the aforementioned United States patent, the cyclones separators are of particular form. More particularly, the separating chamber is in each case in the form of an axially extending surface of revolution having three portions, the three portions having diameters, at their largest diameter ends, of $d_1$, $d_2$ and $d_3$ respectively and lengths $l_1$, $l_2$ and $l_3$ respectively. The three portions may be cylindrical in form in the sense that they have sides which are parallel to the axis of the separating chamber, or they may have a taper. It has been found particularly advantageous that the second portion should have such taper. Furthermore, a flow smoothing tapered portion may be interposed between the first and second portions. The separating chamber has one or more inlets at the first portion arranged for providing inflow of a mixture to be separated with a tangential flow component. There is an axially arranged underflow outlet at the end of the third portion remote from the first portion and an axially arranged overflow outlet at the end of the first portion remote from the third portion. More particularly, the separator of U.S. Pat. No. 4,237,006 is characterised by the following:

$$10 \leq l_2/d_2 \leq 25$$
$$0.04 \leq 4A_i/\pi d_1^2 \leq 0.10$$
$$0.2 \leq d_0/d_2 \leq 0.25$$
$$d_1 > d_2$$
$$d_2 > d_3.$$

where $A_i$ is the total inlet area of the or each inlet.

The arrangement described in U.S. Pat. No. 4,576,724 is generally similar to the arrangement in U.S. Pat. No. 4,237,006 save that the following relationship is in the latter said to apply.

$$d_0/d_2 < 0.1$$

the second portion being tapered, such as with a half angle of taper in the range 20′ to 2°

Generally speaking, cyclone separators, for effective separation of oil-water mixtures, should be of form similar to the above, but it has now been found that constructions of more general form may be suitable. In particular, it is not absolutely essential that the three separately defined portions as above described be provided. For example, arrangements which exhibit a continuous taper change possibly with portions of constant diameter interposed therewithin or at either or both ends may be utilised. In such case, the parameter $d_2$ above described is more generally defined as being the diameter at the axial position $Z_2$ where the following condition is first met along the axis of the separator from an inlet plane (at which $z=o$) defined later:

$$\tan^{-1}\left(\frac{d_2 - d}{2(z - z_2)}\right) < 2° \text{ for all } z > z_2 \text{ where}$$

d is the cyclone diameter at z,

Furthermore, the area $A_i$ may be more generally defined as follows:

$$A_i = \sum_{x=1}^{n} A_{ix}$$

where $A_{ix}$ is the projection of the cross sectional area of the $x^{th}$ inlet measured at entry to the cyclone in the plane parallel to the cyclone axis which is normal to the plane, also parallel to the cyclone axis, which contains the tangential component of the inlet centre line, and the diameter $d_1$ above referred to may be replaced by a parameter $d_i$ defined as follows;

$$d_i = \frac{1}{A_i} \sum_{x=1}^{n} d_{ix}A_{ix},$$

where $d_{ix}$ is twice the radius at which flow enters the cyclone through the $x^{th}$ inlet, (i.e., twice the minimum distance of the tangential component of the inlet centre line from the axis).

The inlet plane is defined as the plane perpendicular to the axis of the cyclone at the mean axial position of the weighted areas of the inlets such that the injection of angular momentum into the hydrocyclone is equally distributed axially about it and is thus such that $$\frac{1}{A_i d_i} \sum_{x=1}^{n} Z_x A_{ix} d_{ix} = 0,$$

wherein $Z_x$ is the axial position of the centre line of the $x^{th}$ inlet.

The diameter $d_3$ may also be more generally defined as the diameter at $z_3$ where $d/d_3 > 0.98$ for all $z > z_3$. Then, further, $\alpha$ is defined as $$\tan^{-1}\left(\frac{d_2 - d_3}{2(z_3 - z_2)}\right)$$

In any event, it should be noted that the parameter $$\frac{4A_i}{\pi d_1^2}$$

abovementioned is similar to, but not identical with, a further parameter which has been determined as being relevant to the design of cyclone separators of the kind in question. That parameter is herein termed the swirl coefficient and is herein designated 'S' and is defined, for the purposes of this specification, as follows:

$$S = \frac{\pi d_i d_2}{4A_i}$$

In particular constructions described in the above described U.S. patent specifications, the diameter $d_2$ is one half the diameter $d_1$. In such case, the swirl coefficient S, as above described has values in the range 5 to 12.5. While it has been found that values within this range are suitable for many applications, it has now been determined that, for certain specific circumstances, optimum operation or near optimum is not provided by use of a cyclone separator exactly as contemplated in the two United States patents. More particularly, certain mixtures have proven difficult to adequately separate by use of such separators. These include mixtures where there is a predominance of water, the water comprising a "continuous" phase, and the oil being present in the form of droplets therewithin so as to comprise a "disperse" phase, and also include such mixtures where the mean oil droplet size is relatively large.

BRIEF DESCRIPTION OF THE INVENTION

In accordance with one aspect of the invention, therefore, there is provided a method of separating a mixture of oil and water, in which the oil is present in droplet form as a disperse phase and the water is present as a continuous phase, by subjecting the mixture to centrifugal action in a cyclone separator of the kind having an elongate axially extending separating chamber defined as a surface of revolution about the axis thereof, the separator having at least one inlet for inlet of said mixture to be separated, with a tangential component of motion about said axis, an overflow outlet for separated said oil, and an underflow outlet for outlet of outlet of separated water, the method comprising admitting the mixture to said separating chamber via said inlet to cause the mixture to undergo centrifugal action and to direct at least a substantial part of said oil to said overflow outlet and of said water to said underflow outlet, the mixture having therein said oil in the form of droplets the mean droplet size of which at least 56.7 micron and said cyclone separator being characterised in that:

$S' \leq S > 5$, where S is the swirl coefficient of the cyclone separator, $$\frac{\pi d_i d_2}{4A_i},$$

$d_i$, $d_2$ and $A_i$ being as above defined, and
$S' = -0.46\phi + 31$, or
$S' = 2$, which ever is the greater, and where $\phi$ is the mean droplet size in micron.

In more particular forms of the invention, the mean droplet size, $\phi$, in micron lies in the range $56.7 \leq \phi \leq 70$ or $56.7 \leq \phi \leq 63$.

BRIEF DESCRIPTION OF THE ACCOMPANYING DRAWINGS

The invention is further described by way of example only with reference to the accompanying drawings in which.

DETAILED DESCRIPTION

Figure 1:
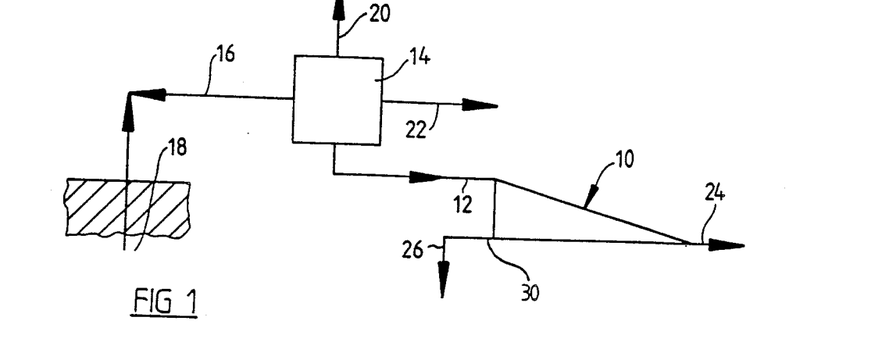
FIG. 1 is a diagram illustrating a method in which the invention is applicable.

Referring now to FIG. 1, a cyclone separator 10 is shown receiving oil on a line 12 from a suitable separating device such as a knock-out tank 14, which in turn receives formation liquid on a line 16 from a subterranean oil field 18. The knock-out tank 14 may be in the form of a settling chamber which receives the formation liquid and has provision for take off of gas which rises to the top of the chamber, via a line 20, for take-off of oil at an intermediate location along the height of the chamber, via a line 22 and for take-off of settled water from the bottom thereof via the aforementioned line 12.

The cyclone separator 10 is designed to remove residual oil from the water on line 12 so that relatively pure water is produced at an underflow outlet 24 from the separator with separated oil being taken on a line 26 as required, such as to cojoin with the line 22. It is desirable that the water taken on line 12 from the knock-out tank 14 be as pure as possible to minimise environmental problems. For example, where the apparatus shown in FIG. 1 is an off-shore oil well, the only practical thing to do with the water so removed at the settling chamber 14 is to dump this back into the sea, and environment protection rules preclude such dumping unless the water has a high purity, that is to say, unless it is as free as possible from oil. Thus, the use of the cyclone separator 10 at the location shown is important for environmental reasons.

In accordance with the teachings of this invention, the separator 10 may, as above described, be of any suitable form for a cyclone separator adapted for separating small quantities of oil from large quantities of water. The aforementioned U.S. patent specifications describe two constructions which are so suitable. Each of these is generally in the form of FIG. 2, having a separating chamber 32 with a first portion 34 of relatively large diameter a second portion 36 which is of tapered form but which has a maximum diameter rather less than the diameter of the portion 34 and a third portion 38 of smaller diameter again, these cojoining but with a tapered flow smoothing portion 34a interconnecting the portions 34 and 36.

Figure 2:
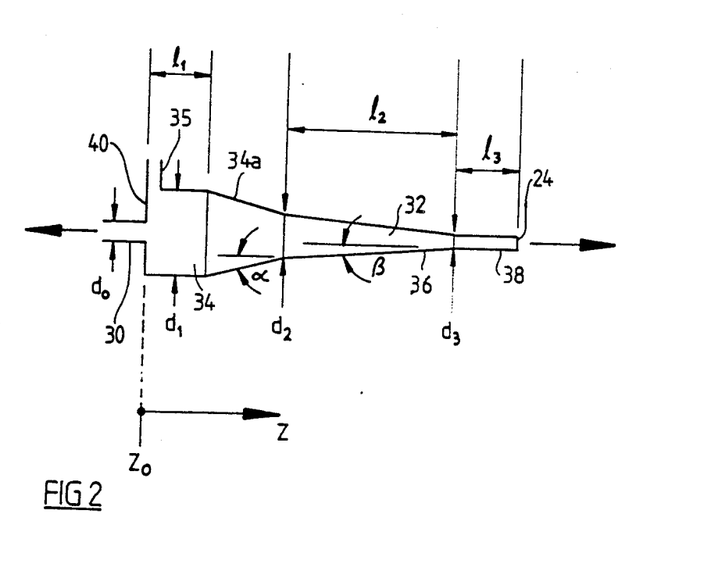
FIG. 2 shown an exemplary cyclone separator constructed in accordance with the teachings of this invention.

The separating chamber 32 is thus of generally tapered form having a larger diameter end at the portion 34 and a smaller diameter end at the portion 38.

There is, at the larger diameter end of the separating chamber, that is to say at the end of portion 34 remote from portion 38, the previously described overflow outlet 24 and, at the end of the separating chamber remote from portion 24, the previously described underflow outlet 24 leading from portion 38 at the smaller diameter end of the separating chamber.

One or more tangential inlets is provided at the larger diameter portion 34 for inflow of liquid mixture to be separated. In this case a single such inlet 34 is shown. At least two such inlets are preferably provided, but a single inlet may be employed if it is of a particular form as described in the specification of the International application PCT/AU85/00010.

An exemplary cyclone separator is constructed in accordance with the above and useful in this invention may be characterised as follows:

$l_1 > l_2$
$l_2 > l_3$
$l_2/d_2 > 10$
$d_o/d_2 < 0.25$ such as $< 0.10$, the swirl coefficient $$S = \frac{\pi d_i d_2}{4A_i} \text{ or } \frac{\pi d_1 d_2}{4A_i}$$

in this case being chosen as later described,

In exemplary forms the following may also apply:

$20' < \alpha < 2°$
$\beta \geq 10°$, such as $\beta = 45°$

In these last mentioned formulae, $d_1$ is the diameter of the cyclone separator at its largest diameter end, $d_3$ is the diameter of the cyclone separator at its smaller diameter end, (that is to say the diameter of the portion 38), $d_2$ is the diameter of the portion 36 at its largest diameter end $l_1$, $l_2$, and $l_3$ are, respectively, the lengths of the portions 34, 36 and 38, $\alpha$ is the half angle of taper of the portion 34a and $\beta$ is the half angle taper of the portion 22, $d_o$ is the diameter of the overflow outlet 24, the diameter of the underflow outlet 24 being equal to $d_3$.

Cyclone separators of different form may be used. For example, these may be characterised as next described, where $d_2$ is the diameter of the cyclone separator at the point $Z_2$ where the following relationship first applies:

$$\tan^{-1}\left(\frac{d_2 - d}{2(z - z_2)}\right) < 2° \text{ for all } z > z_2$$

where d is the cyclone diameter at z, and $z_2$ is reckoned in the direction Z shown in FIG. 2 from a location $Z_o$, along the axis of the cyclone separator, the location $Z_o$ being the location of the inlet plane previously defined. That is, the inlet plane is defined as the plane perpendicular to the axis of the cyclone at the mean axial position of the weighted areas of the inlets such that the injection of angular momentum into the hydrocyclone is equally distributed axially about it and is thus such that $$\frac{1}{A_i d_i} \sum_{x=1}^{n} Z_x A_{ix} d_{ix} = 0,$$

wherein $Z_x$ is the axial position of the centre line of the $x^{th}$ inlet.

The inlet plane is designated by reference numeral 40, and is located towards the larger diameter end of the separating chamber.

As previously mentioned, further characterising equations for suitable separators, generally defined are:

$$A_i = \sum_{x=1}^{n} A_{ix}$$

where $A_{ix}$ is the projection of the cross sectional area of the $x^{th}$ inlet measured at entry to the cyclone in the plane parallel to the cyclone axis which is normal to the plane, also parallel to the cyclone axis, which contains the tangential component of the inlet centre line.

$$d_i = \frac{1}{A_i} \sum_{x=1}^{n} d_{ix} A_{ix},$$

where $d_{ix}$ is twice the radius at which flow enters the cyclone through the $x^{th}$ inlet, (i.e., twice the minimum distance of the tangential component of the inlet centre line from the axis). The diameter $d_3$ may also be more generally defined as the diameter at $z_3$ where $d/d_3 > 0.98$ for all $z > z_3$. Then, further, $\alpha$ is defined as $$\tan^{-1}\left(\frac{d_2 - d_3}{2(z_3 - z_2)}\right)$$

As mentioned above, separators generally similar to that as above shown may be employed in the present invention where the form of the separating chamber is not exactly as shown. For example, the separating chamber may exhibit a continuous taper at least of the portions 34a, 32 and 38, the taper angle decreasing in the direction towards the underflow outlet 24.

Figure 3:
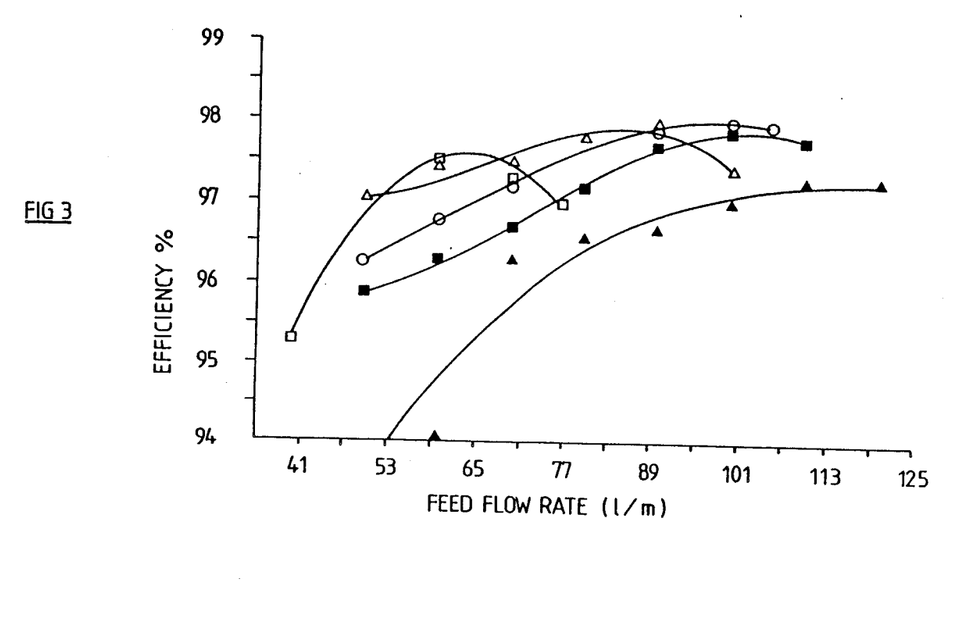
FIGS. 3 to 7 are respective graphical representations of variation of separation efficiency versus feed flow rate for cyclone separators having varying swirl coefficients when used in the apparatus of FIG. 1, respectively for liquid mixtures having five different mean sizes of oil droplets therewithin.
Figure 4:
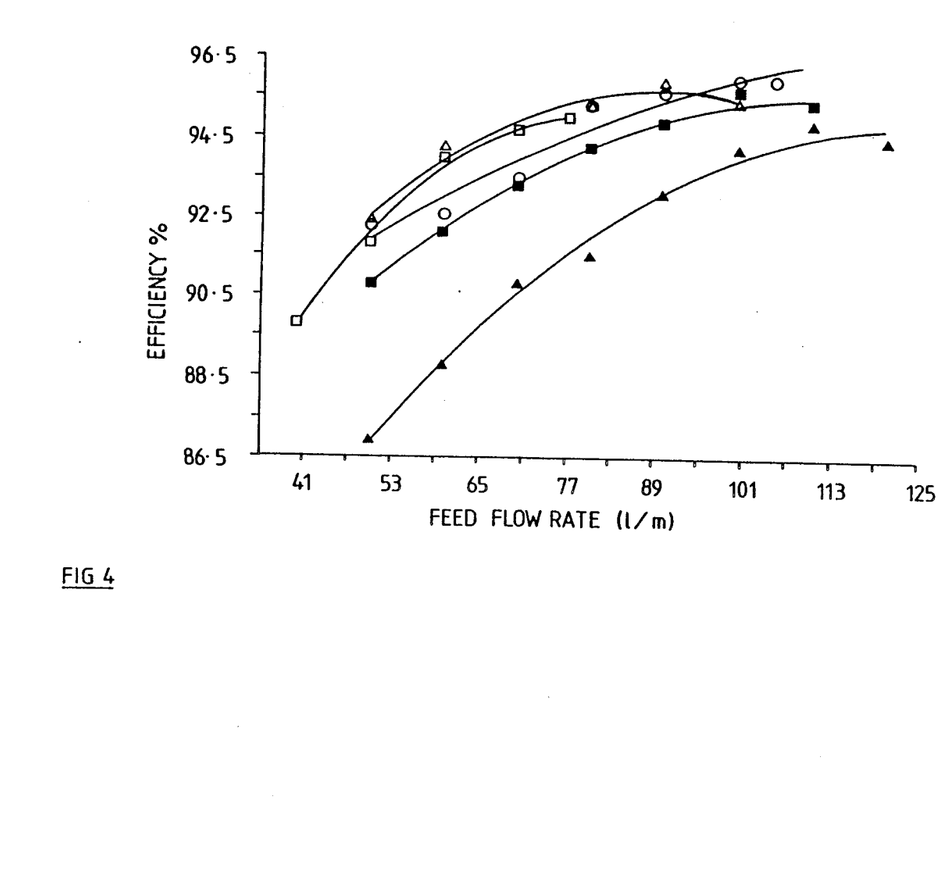
Figure 5:
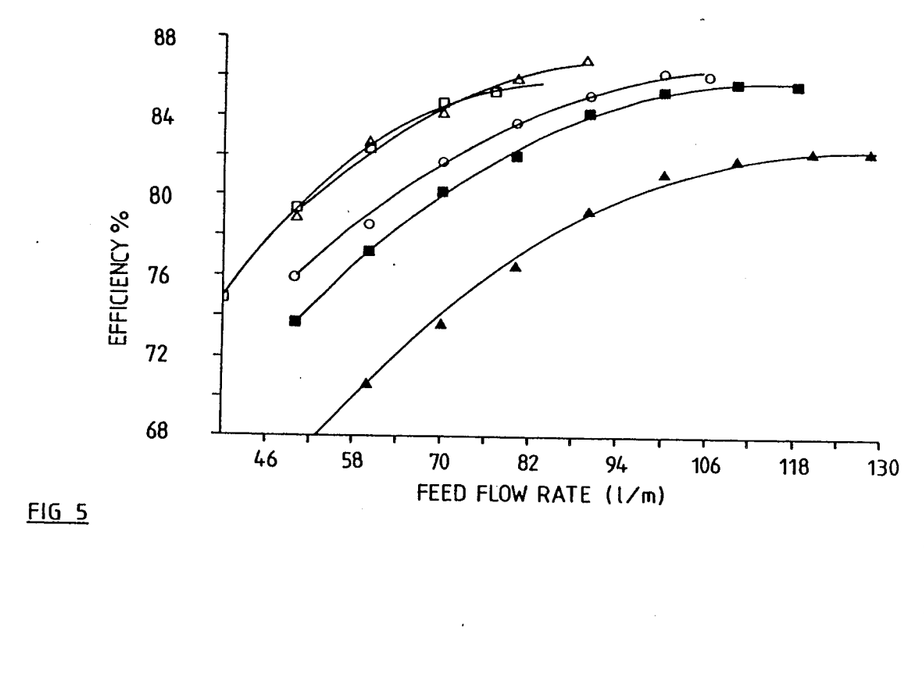
Figure 6:
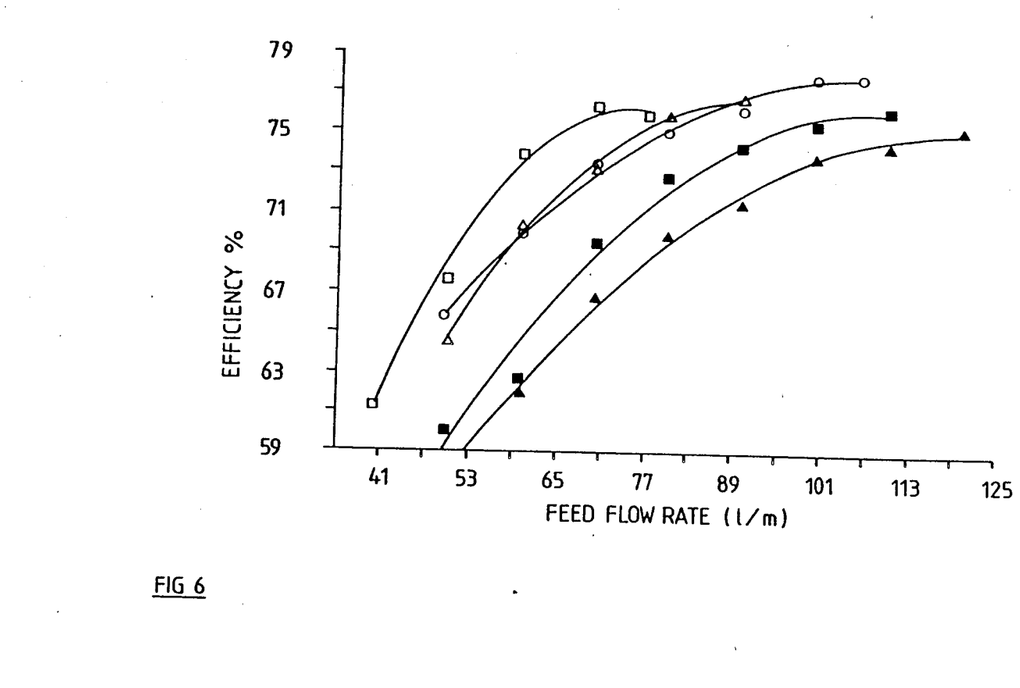
Figure 7:
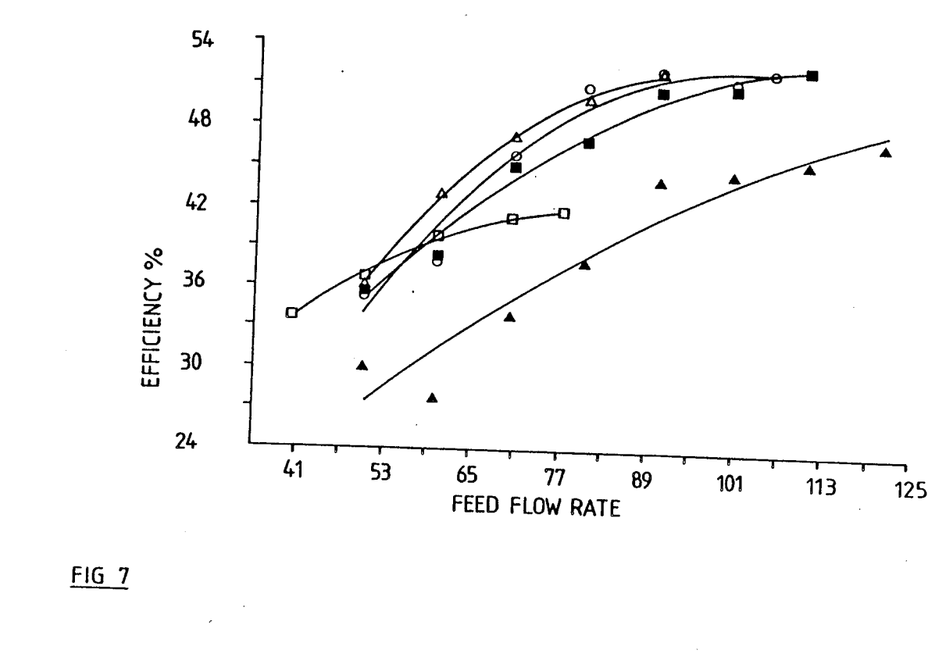
Figure 8:
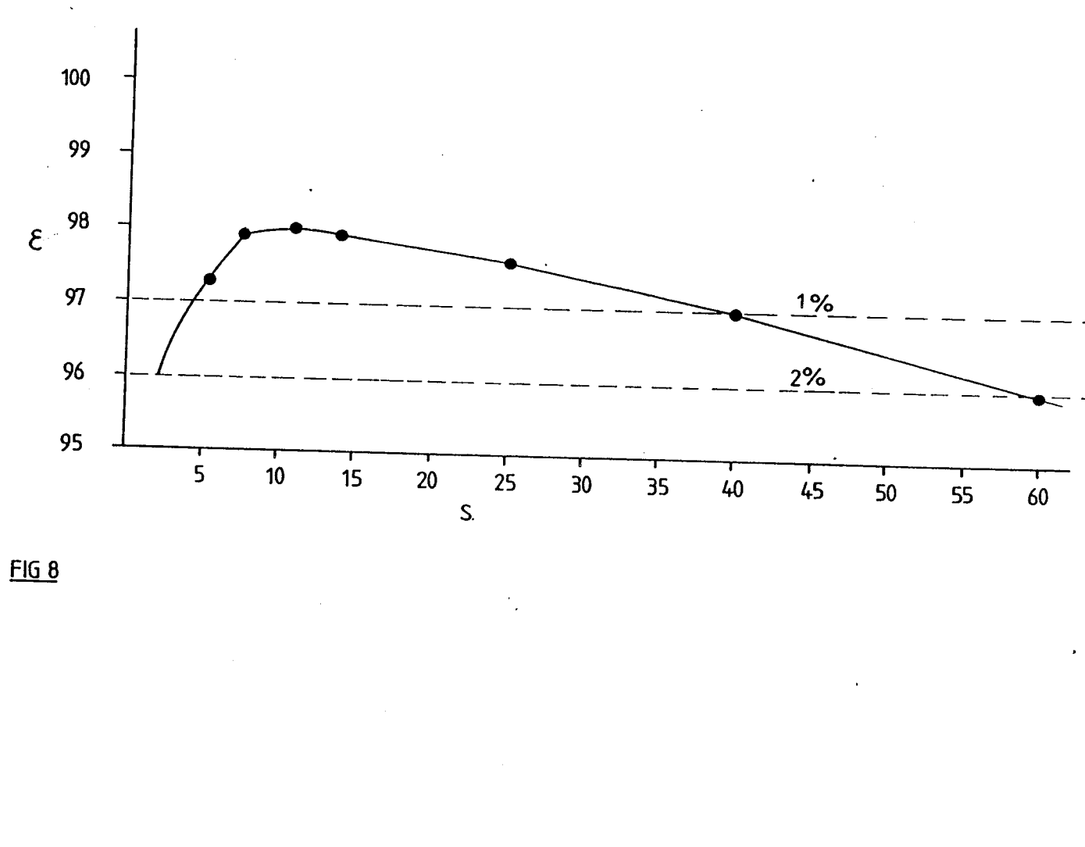
FIGS. 8 to 12 inclusive are graphical representations of variations in efficiency versus swirl coefficient for liquid mixtures having mean droplet sizes corresponding to the sizes to which the respective data in FIGS. 2 to 7 relate.
Figure 9:
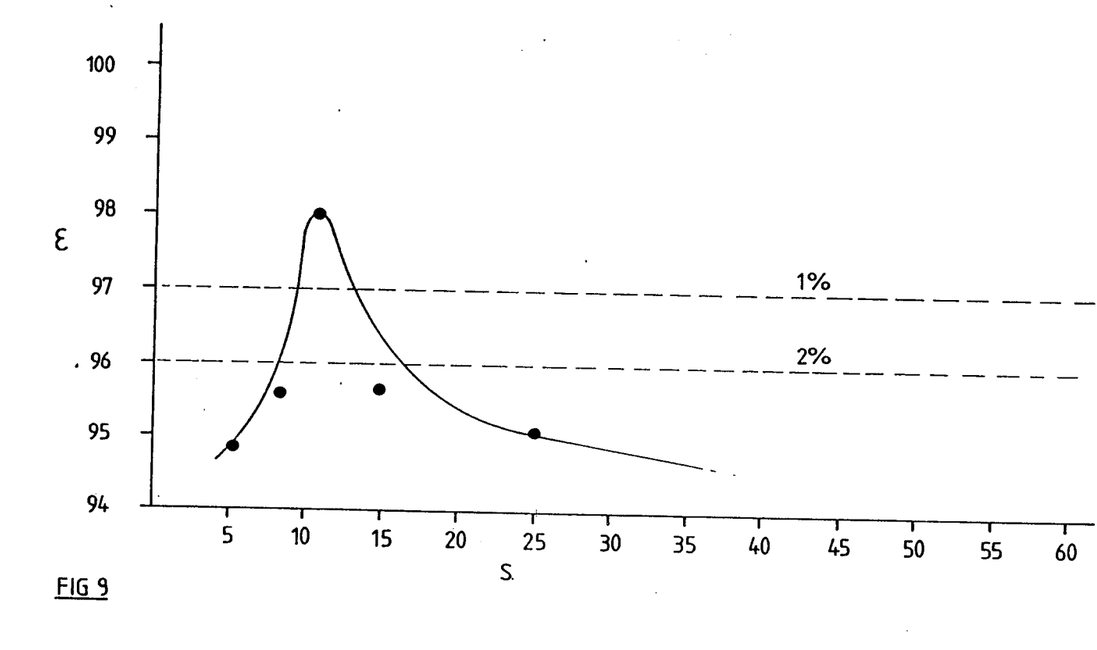
Figure 10:
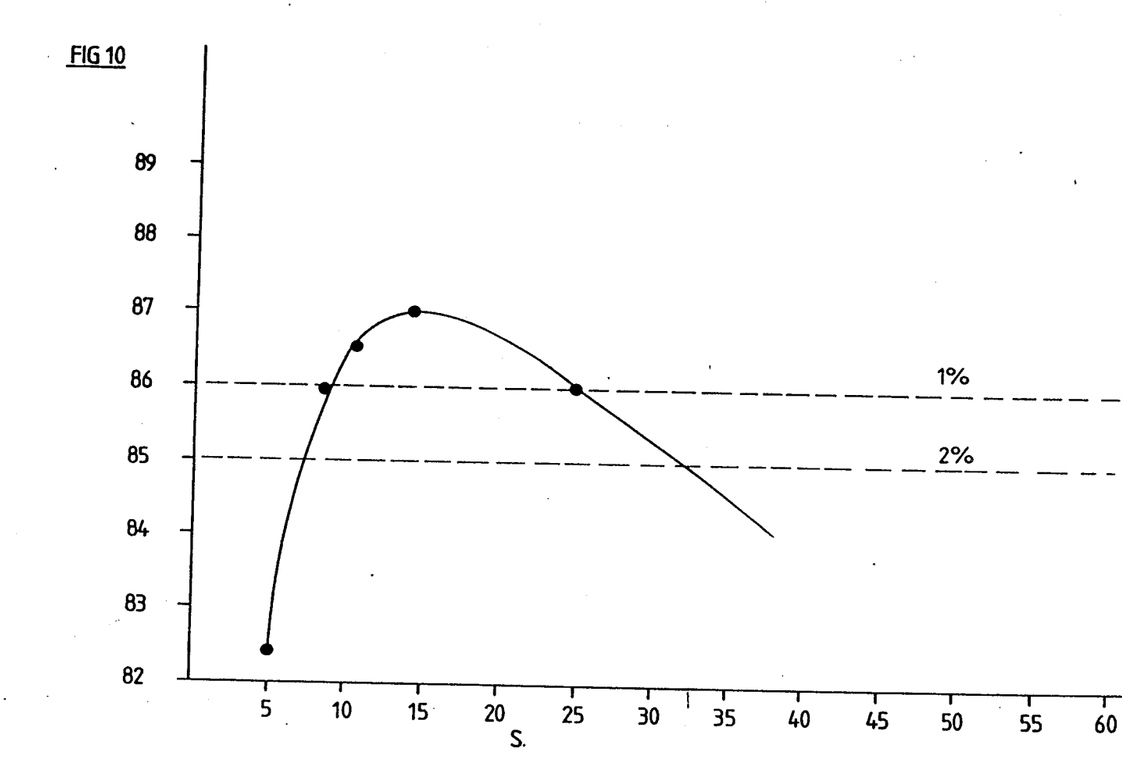
Figure 11:
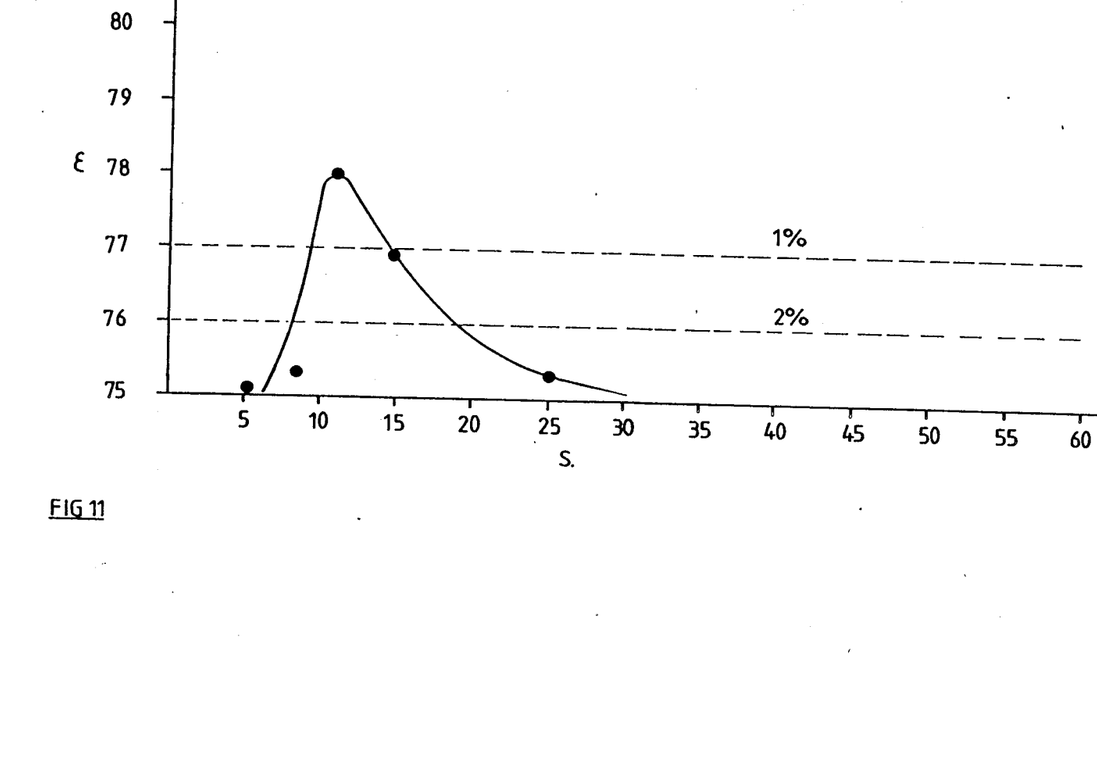
Figure 12:
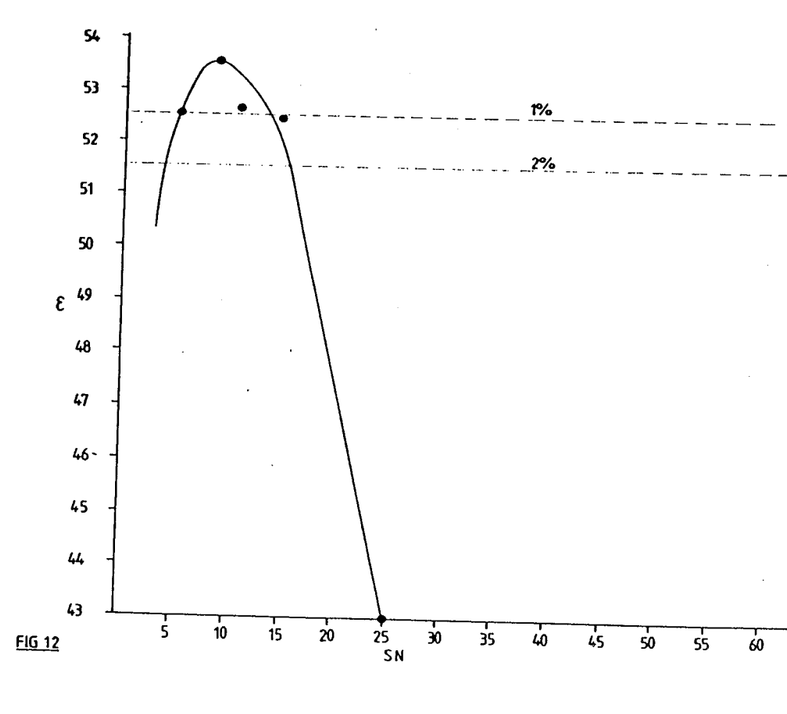

Referring now to FIGS. 3 to 7 inclusive, there are shown plots of efficiency versus feed flow rate through a cyclone separators, for various cyclone separators constructed generally in accordance with FIG. 2, but exhibiting different swirl coefficient, $\pi d_i d_2/4A_i$, the variation in swirl coefficient being effected by varying the inlet area for inflow of liquid, that is to say by varying $A_i$. The plots for FIGS. 3 to 8 were taken, using, respectively, oil water mixtures having similar oil concentrations, and wherein the oil was present in the form of a disperse phase having, respectively, mean droplet sizes, or diameters, as follows:

FIG. 3: 63 micron
FIG. 4: 50 micron
FIG. 5: 35 micron
FIG. 6: 26 micron
FIG. 7: 17 micron As indicated on each Figure, the plots within each Figure are for cyclone separators having swirl coefficients as follows:

Swirl coefficient=25 (plots indicated "☐")
Swirl coefficeint=14.8 (plots indicated by "Δ")
Swirl coefficient=11 (plots indicated by "x")
Swirl coefficient=8.54 (plots indicated by "■")
Swirl coefficient=5.2 (plots indicated by "▲")

It will be noted that, generally speaking, the plots indicate a rise in separation efficiency (efficiency being measured as the proportion of oil recovered from the mixture) with increasing flow rate up to a certain point, whereafter, generally, the efficiency will drop with further increasing flow rate. The ultimate efficiency reached in each instance is, however, variable in accordance with the swirl coefficient adopted for the particular separator used, and FIGS. 8 to 12 inclusive illustrate the variation, for each mean droplet size in admixture, of maximum efficiency obtainable as against swirl coefficient. Again, in each instance there is a rise in efficiency as the swirl coefficient increases up to a certain point whereupon with increased swirl coefficient, the efficiency drops, this being so for each of the droplet sizes tested.

Figure 13:
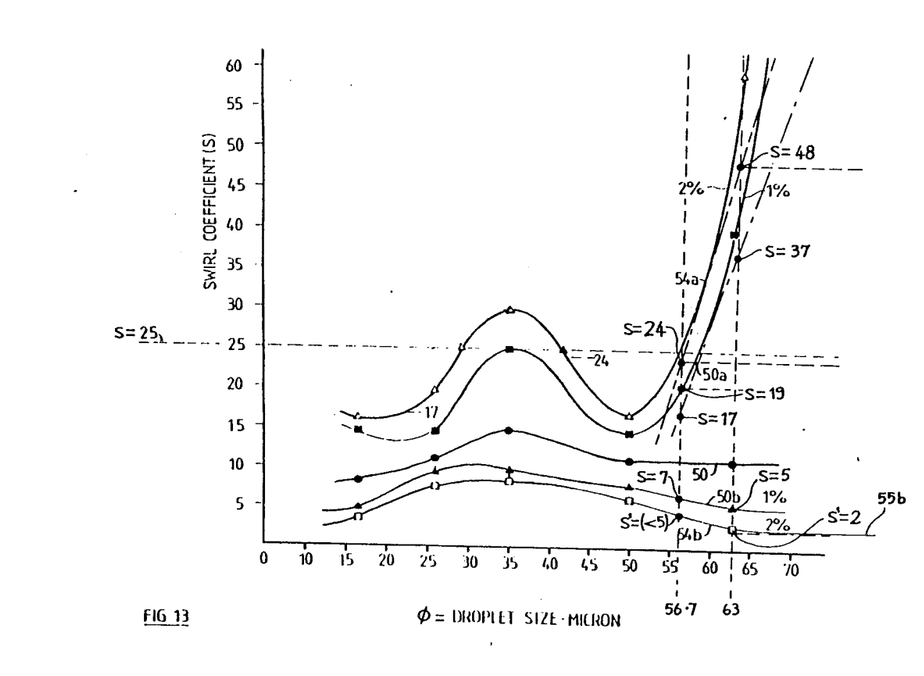
FIG. 13 is a graphical representation or variation in swirl coefficient as against droplet size, derived from the data in FIGS. 2 to 12 inclusive.

In FIG. 13 there are plotted on plot 50 the variation in most effective swirl coefficient for each mean droplet size taken from the plots in FIGS. 8 to 12. Again, this shows a rise in most efficacious swirl coefficient with increasing droplet size up to about 35 micron whereupon the most efficient swirl coefficient decreases with droplet size. Also shown in FIG. 13 are two plots 50a, 50b representing respectively the upper and lower ranges of swirl coefficient about the optimum swirl coefficient for each mean droplet size at which the efficiency of separation has dropped by only 1% s compared with the optimum swirl coefficient as plotted on plot 50. These plots are obtained by noting the intersections of horizontal lines on FIGS. 8 to 12, with the plots shown therein the horizontal lines representing points of variation of 1% from the maximum efficiency point represented by each plot.

Further shown in FIG. 13 are plots 54a, 54b, these plots being plots of swirl coefficient, respectively above and below the plot of optimum swirl coefficient, for which efficiency has dropped by 2% as compared with the efficiency obtained from the optimum swirl coefficient for any particular droplet size. The points on this plot are determined from intersections of plots of FIGS. 8 to 12 with respective horizontal lines at 2% below the optimum plotted efficiency in each of these Figures.

It will be noted that, contrary to previous expectation, there is a region for which swirl coefficients lower than those customarily employed are useful with advantage. In particular, over the region of sizes from 56.7 micron up, say up to 70 micron it is possible to employ separators having a swirl coefficient less than 5 such as in the range:

$S' \leq S < 5$, where, substantially, $S' = -0.46 \phi + 31$, or $S' = 2$, whichever is the greater, where $\phi$ is the mean droplet size, measured in micron. Over the range 56.7 to 63 micron, substantially, $S' = -0.46 \phi + 31$. This manner of variation as between swirl number and droplet size is derived by linear approximation of the observed variation over the ranges described. These ranges are those for which only a 2% departure from the performance achieved by using the optimum swirl coefficient (as represented by plot 50) will prevail. More generally, it is possible to utilize, for droplet sizes greater than 56.7 micron, a swirl number in the range $S' \leq S \leq 25$ or $S'' \leq S \leq 19$ where $S'$ is as above described and $S'' = -0.32 \phi + 18.24$ or
$S'' = 5$, whichever is the greater over the range of mean droplet sizes 56.7 to 63 micron,
$S'' = -0.32 \phi + 18.24$.

As will be seen from FIG. 13, use of swirl coefficients up to 25 will, for the ranges mentioned, enable operation with no less than 2% comparative loss of efficiency as compared with the efficiency obtainable by using the optimal swirl coefficient, whilst use of a swirl coefficient up to 19 will enable operation with less than 7% relative decrease in efficiency.

Over the range of mean droplet sizes up to above 56.7 micron such as in the range 56.7 to 70 or 56.7 to 63 micron it is possible to utilize maximum swirl coefficients as at least up to a value $S^{ul}$, where $S^{ul} = 0.32 \phi + 16.8$, for a loss of no more than 1% efficiency compared with the efficiency obtained using the optimum efficiency, or at least up to $S^{u2}$, where $S^{u2} = 0.26 \phi + 31.6$ for a loss of no more than 2% efficiency as compared with the efficiency obtained using the optimum efficiency. These relationships are derived by linear approximation of the variation as between swirl coefficients and mean droplet sizes as represented by plots 54b, 54a in FIG. 13.

Thus, more generally, for no more than 1% comparative loss of efficiency the following range of swirl coefficients, at least, may be utilized:

$S' \leq S \leq S^{ul}$, or for no more than 2% comparative loss of efficiency, the following range of swirl coefficients at least, may be utilized $S'' \leq S \leq S^{u2}$.

The variation in swirl coefficient for each tested plot was achieved by varying the diameter of two circular cross-section tangential feed inlets of the separator to give the ratios $D_i/d_2$ as follows, where $D_i$ is the inlet diameter and $d_2$ is as above defined:

| SWIRL COEFFICIENT | $D_i/d_2$ |
| --- | --- |
| 25 | 0.2 |
| 14.8 | 0.26 |
| 11 | 0.3 |
| 8.54 | 0.35 |
| 5.2 | 0.45 |

The described construction has been advanced merely by way of explanation and many modifications may be made thereto without departing from the spirit and scope of the invention which includes every novel feature and combination of novel features herein disclosed.

I claim:

1. A method of separating a mixture of oil and water, in which the oil is present in droplet form as a disperse phase and the water is present as a continuous phase, by providing a cyclone separator having a single continuous taper change possibly with portions of constant diameter interposed therewithin or at either or both ends which can separate oil-water mixtures substantially as effectively as a cyclone separator including three separately defined portions, subjecting the mixture to centrifugal action in said cyclone separator of the kind having an elongate axially extending separating chamber defined as a surface of revolution about the axis thereof, the separator having at least one inlet for inlet of said mixture to be separated, with a tangential component of motion about said axis, an overflow outlet for outlet of separated oil, and an underflow outlet for outlet of separated water, the method comprising admitting the mixture to said separating chamber via said inlet to cause the mixture to undergo centrifugal action and to direct at least a substantial part of said oil to said overflow outlet and of said water to said underflow outlet, the mixture having therein said oil in the form of droplets the mean droplet size of which lies in the range 22 to 50 micron and said cyclone separator being characterised in the 'S' is greater than 12.5, where S is the swirl coefficient of the cyclone separator.

2. A method as claimed in claim 1 wherein said mean droplet size lies in the range 56.7 to 70.

3. A method as claimed in claim 1 wherein said mean droplet size is in the range 56.7 to 63 micron and $S' \leq S < 5$.

4. A method of separating a mixture of oil and water, in which the oil is present in droplet form as a disperse phase and the water is present as a continuous phase, by C1 subjecting the mixture to centrifugal action in said cyclone separator of the kind having an elongate axially extending separating chamber defined as a surface of revolution about the axis thereof, the separator having at least one inlet for inlet of said mixture to be separated, with a tangential component of motion about said axis, an overflow outlet for separated said oil, and an underflow outlet for outlet of separated said water, the method comprising admitting the mixture to said separating chamber via said inlet to cause the mixture to undergo centrifugal action and to direct at least a substantial part of said oil to said overflow outlet and of said water to said underflow outlet, the mixture having therein said oil in the form of droplets the means droplet size of which at least 56.7 micron and said cyclone separator being characterized in that:
$S'' \leq S \leq S^{u2}$, where
$S'' = -0.32 \phi + 18.24$, or
$S'' = 5$, whichever is the greater, $\phi$ being the mean droplet size in micron, and
$S^{u2} = 0.26 \phi 31.6$.

5. A method as claimed in claim 4 wherein $56.7 \leq \phi \leq 70$.

6. A method of separating a mixture of oil and water in which the oil is present in droplet form as a disperse phase and the water is present as a continuous phase, by providing a cyclone separator having a single continuous taper change possibly with portions of constant diameter interposed therewithin or at either or both ends which can separate oil-water mixtures substantially as effectively as a cyclone separator including three separately defined portions, subjecting the mixture to centrifugal action in said cyclone separator of the kind having an elongate axially extending separating chamber defined as a surface of revolution about the axis thereof, the separator having at least one inlet for inlet of said mixture to be separated, with a tangential component of motion about said axis, an overflow outlet for outlet of separated oil, and an underflow outlet for outlet of separated water, the method comprising admitting the mixture to said separating chamber via said inlet to cause the mixture to undergo centrifugal action and to direct at least a substantial part of said oil to said overflow outlet and of said water to said underflow outlet, the mixture having therein said oil in the form of droplets the means droplet size of which lies in the range 28 to 42 micron and said cyclone separator being characterized in that $8 \leq S \leq 25$, where 'S' is the swirl coefficient of the cyclone separator.

7. A method as claimed in claim 4 wherein $56.7 \leq \phi \leq 63$ and $S' = -0.46 \phi + 31$.

8. A method as claim in claim 7, wherein $S \leq 25$.

9. A method as claimed in claim 4 wherein $S \leq 25$.

10. A method of separating a mixture of oil and water, in which the oil is present in droplet form as a disperse phase and the water is present as a continuous phase, by C1 subjecting the mixture to centrifugal action in said cyclone separator of the kind having an elongate axially extending separating chamber defined as a surface of revolution about the axis thereof, the separator having at least one inlet for inlet of said mixture to be separated, with a tangential component of motion about said axis, an overflow outlet for separated said oil, and an underflow outlet for outlet of separated said water, the method comprising admitting the mixture to said separating chamber via said inlet to cause the mixture to undergo centrifugal action and to direct at least a substantial part of said oil to said overflow outlet and of said water to said underflow outlet, the mixture having therein said oil in the form of droplets the mean droplet size of which at least 56.7 micron and said cyclone separator being characterised in that:
$S' \leq S \leq S^l$, where $S' = -0.46 \phi + 31$, or
$S' = 2$, which ever is the greater, and where $\phi$ is the means droplet size in micron, and
$S^{ul} = 0.32 \phi + 16.8$.

11. A method as claimed in claim 10 wherein $56.7 \leq \phi \leq 70$.

12. A method of separating a mixture of oil and water, in which the oil is present in droplet form as a disperse phase and the water is present as a continuous phase, by providing a cyclone separator having a single continuous taper change possibly with portions of constant diameter interposed therewith or at either or both ends which can separate oil-water mixtures substantially as effectively as a cyclone separator including three separately defined portions, subjecting the mixture to centrifugal action in said cyclone separator of the kind having an elongate axially extending separating chamber defined as a surface of revolution about the axis thereof, the separator having at least one inlet for inlet of said mixture to be separated, with a tangential component of motion about said axis, an overflow outlet for outlet of separated oil, and an underflow outlet for outlet of separated water, the method comprising admitting the mixture to said separating chamber via said inlet to cause the mixture to undergo centrifugal action and to direct at least a substantial part of said oil to said overflow outlet and of said water to said underflow outlet, the mixture having therein said oil in the form of droplets the means droplet size of which lies in the range 33 to 38 micron and said cyclone separator being characterised in that $8 \leq S \leq 28$, where 'S' is the swirl coefficient of the cyclone separator.

13. A method as claimed in claim 10 wherein $56.7 \leq \phi \leq 63$ and $S' = -0.46$.

14. A method as claimed in claim 13 wherein $S \leq 19$.

15. A method as claimed in claim 10 wherein $S \leq 19$.

* * * * *